E. H. HOLLIS.
SAFETY VALVE MECHANISM FOR GAS PIPES.
APPLICATION FILED APR. 26, 1909.
976,078.  Patented Nov. 15, 1910.
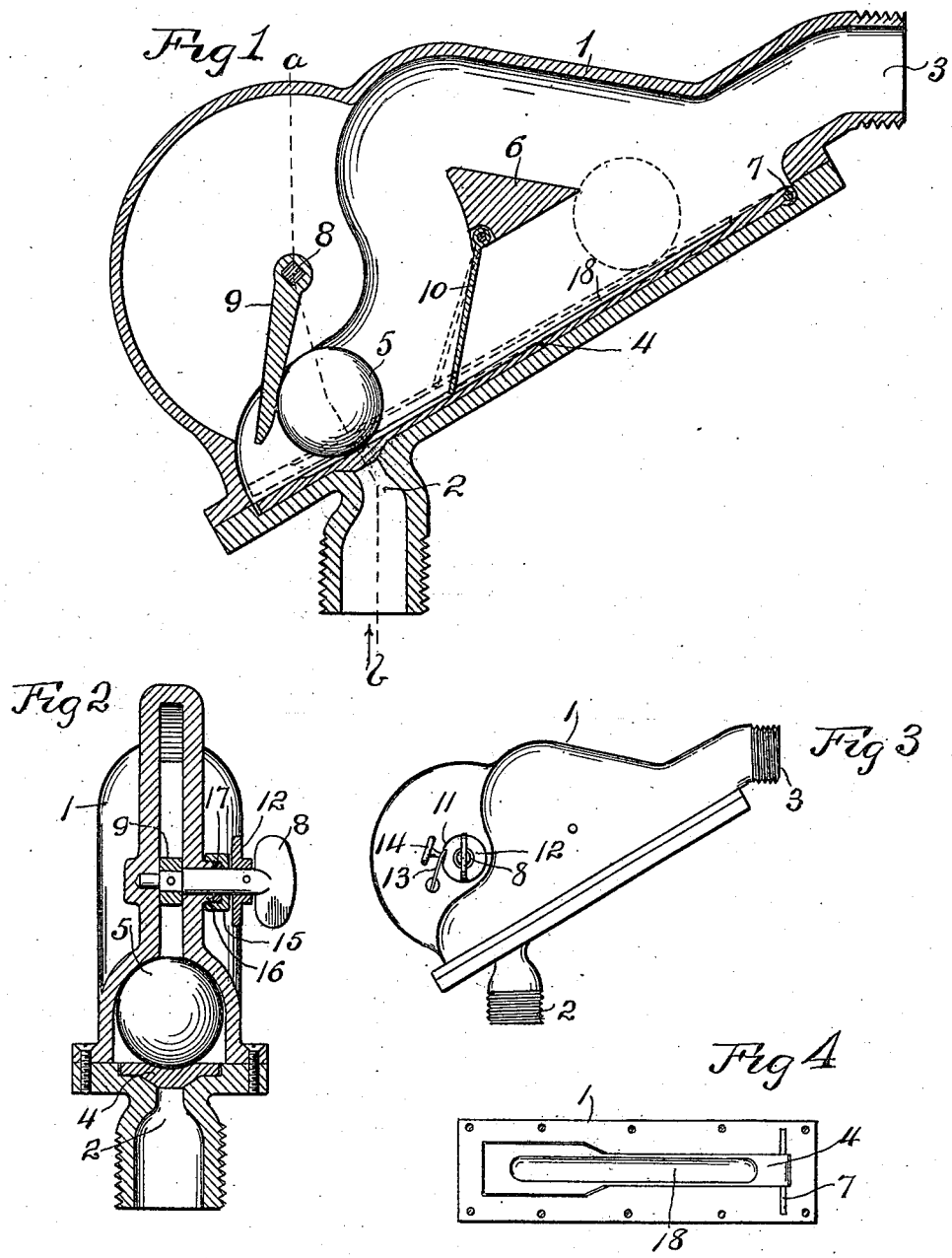
WITNESSES:
R. E. Hamilton
E. B. House
INVENTOR.
Elbert H. Hollis
BY
Warren D. House
His ATTORNEY.

UNITED STATES PATENT OFFICE.

ELBERT H. HOLLIS, OF KANSAS CITY, MISSOURI, ASSIGNOR OF TWO-THIRDS TO JOHN M. COPPINGER, OF KANSAS CITY, MISSOURI, AND ONE-THIRD TO M. F. LYNCH, OF EXCELSIOR SPRINGS, MISSOURI.

SAFETY-VALVE MECHANISM FOR GAS-PIPES.

976,078.

Specification of Letters Patent.

Patented Nov. 15, 1910.

Application filed April 26, 1909. Serial No. 492,193.

*To all whom it may concern:*

Be it known that I, ELBERT H. HOLLIS, a citizen of the United States, residing at Kansas City, in the county of Jackson and State of Missouri, have invented certain new and useful Improvements in Safety-Valve Mechanisms for Gas-Pipes, of which the following is a specification.

My invention relates to improvements in safety valve mechanisms for gas pipes.

The object of my invention is to provide a safety device by which the gas will be shut off automatically upon decrease in the pipes of the gas pressure below a predetermined point.

My invention provides manually operated means by which the flow of gas may be reestablished after having been automatically shut off.

The novel features of my invention are hereinafter fully described and claimed.

In the accompanying drawings illustrative of the preferred form of my invention, Figure 1 is a longitudinal central vertical sectional view of the device. Fig. 2 is a cross section taken on the dotted line $a$—$b$ of Fig. 1. Fig. 3 is a side elevation. Fig. 4 is a plan view with the upper part of the casing and ball removed.

Similar characters of reference denote similar parts.

1 denotes the casing which may be of any desired form, and which is provided at its lower side with an inlet 2 communicating with the supply pipe, not shown.

3 denotes the gas outlet.

4 denotes a valve preferably hinged in an inclined position in the casing 1 and adapted to swing by gravity to a position shown in solid lines in Fig. 1, in which position the valve will close the inlet 2. On the valve is mounted a valve closing device, preferably a ball 5 which when the valve is in the closed position is adapted to run by gravity from the position shown in dotted lines in Fig. 1 to the position shown in solid lines in said figure.

6 denotes a detent, preferably in the form of a horizontal bar located above the valve 4 intermediate the inlet 2 and the pivot of the valve, the pivot being denoted by 7.

Any suitable manually operated means may be employed for moving the ball 5 from the position holding the valve closed to the position shown in dotted lines in Fig. 1. In the drawings I have shown a horizontal shaft which extends through one side of the casing in which it is rotatively mounted. Said shaft denoted by 8 is provided within the casing 1 with a radial arm 9 disposed so that by rotating the shaft in the proper direction the arm will engage and force the ball 5 over the detent 6. As soon as the ball 5 has been so moved the gas pressure will force the valve 4 to the open position, shown in dotted lines in Fig. 1. When the ball 5 passes over the detent 6 it will fall upon the raised valve above the detent, the latter preventing the ball rolling down the inclined valve. In case that the gas pressure should fall below a predetermined point, the valve 4 will lower and the ball 5 will then run by gravity to the closed position shown in solid lines in Fig. 1. In this position the upper side of the ball 5 will engage the casing 1 so that if the gas pressure increases the valve 4 can not be opened thereby until the ball has again been manually moved to the upper position shown in Fig. 1.

To insure the arm 9 forcing the ball 5 over the detent 6 instead of below it, a transverse plate 10 is hinged at its upper edge to the detent 6, the lower edge of the plate resting upon the upper side of the valve 4.

Suitable means are provided for releasably locking the shaft 8 from being accidentally rotated so that the ball 5 will be prevented by the arm 9 from rolling to the holding position. On the shaft 8 at the outer side of the casing 1 is secured a disk 12 having a ratchet tooth 11 which is normally engaged by a spring pawl 13 having one end secured to the casing 1 and provided with a button 14 by which the pawl may be withdrawn from the ratchet wheel or disk 12 when it is desired to operate the arm 9 to force the ball to a position releasing the valve 4.

As shown in Fig. 2 the shaft 8 is preferably encircled outside the casing 1 by a screw threaded packing ring 15 which engages a threaded boss 16 on the outer wall of the casing 1. Packing material 17 encircles the shaft 8 intermediate the ring 15 and boss 16.

If desired the upper side of the valve 4 may be provided with a longitudinal groove 18 in which is located the ball 5.

Sometimes the supply of gas to a house is temporarily shut off owing to a break in the main or for some other reason. At such times there is great danger of people in the house being asphyxiated when the gas is again supplied to the service pipes. With the use of my invention such a result is prevented.

I do not confine my invention to the precise structure illustrated and described, as many modifications, within the scope of the appended claims, may be made without departing from the spirit of my invention.

Having thus described my invention, what I claim and desire to secure by Letters Patent, is:—

1. In a safety valve mechanism for gas pipes, the combination with a valve casing having an inlet, of a normally inclined valve hinged in said casing and movable by gravity to a position closing said inlet and movable by a predetermined gas pressure to the open position, a roller movable on said valve to a position in which it will hold the valve closed, a detent for engaging said roller to hold it from moving to said position only while the valve is open, and manually operated means for moving the roller from said position into engagement with said detent.

2. In a safety valve mechanism for gas pipes, the combination with a valve casing having an inlet, of a valve pivotally mounted in an inclined position in said casing and movable by gravity to a position closing said inlet and movable by a predetermined gas pressure to an open position, a roller movable on said valve to a position in which it will hold the valve closed, a detent, manually operated means for moving the roller from said position into engagement with said detent, the roller being held by said detent from moving into the said position only while the valve is open, and releasable means for holding the manually operated means from operation.

3. In a safety valve mechanism for gas pipes, the combination with a valve casing having an inlet, of a valve hinged in an inclined position in said casing and movable by gravity to a position closing said inlet and movable by a predetermined gas pressure to the open position, a ball normally mounted on said valve and adapted to roll thereon when the valve is closed to a position in which it will hold the valve closed, a detent for holding the ball from moving to said position while the valve is in the open position, and manually operated means for forcing the ball from said position into a position in which it will be held by said detent until the valve closes.

In testimony whereof I have signed my name to this specification in presence of two subscribing witnesses.

ELBERT H. HOLLIS.

Witnesses:
E. B. HOUSE,
L. H. DOERING.